United States Patent [19]

Doty et al.

[11] Patent Number: 5,098,455
[45] Date of Patent: Mar. 24, 1992

[54] REGENERABLE EXHAUST GAS FILTER ELEMENT FOR DIESEL ENGINES

[75] Inventors: Peter A. Doty; John R. Moyer; Neal N. Hughes, all of Midland, Mich.

[73] Assignee: The Dow Chemical Company, Midland, Mich.

[21] Appl. No.: 633,580

[22] Filed: Dec. 21, 1990

[51] Int. Cl.$^5$ ............................................. B01D 39/20
[52] U.S. Cl. ........................ 55/523; 55/DIG. 10; 55/DIG. 30
[58] Field of Search ........ 55/523, DIG. 10, DIG. 30; 501/5, 6, 151

[56] References Cited

U.S. PATENT DOCUMENTS

| | | | |
|---|---|---|---|
| 4,278,544 | 7/1981 | Takashima | 55/523 X |
| 4,283,210 | 8/1981 | Mochida et al. | 55/523 |
| 4,293,357 | 10/1981 | Higuchi et al. | 55/523 X |
| 4,340,403 | 7/1982 | Higuchi et al. | 55/DIG. 30 |
| 4,364,760 | 12/1982 | Higuchi et al. | 55/DIG. 30 |
| 4,560,478 | 12/1985 | Narumiya | 55/523 X |
| 4,629,483 | 12/1986 | Stanton | 55/DIG. 30 |
| 4,632,683 | 12/1986 | Fukutani et al. | 55/DIG. 30 |
| 4,652,286 | 3/1987 | Kusuda et al. | 55/DIG. 30 |
| 4,761,323 | 8/1988 | Mühlratzer et al. | 55/523 X |
| 4,818,317 | 4/1989 | Otaka et al. | 55/523 X |
| 4,875,335 | 10/1989 | Arai et al. | 55/DIG. 30 |
| 4,921,616 | 5/1990 | Minjolle | 55/523 X |
| 4,976,760 | 12/1990 | Helferich et al. | 55/523 X |

FOREIGN PATENT DOCUMENTS

| | | | |
|---|---|---|---|
| 1168994 | 6/1984 | Canada | 55/523 |
| 62-26312 | 2/1987 | Japan | 55/523 |
| 63-31517 | 2/1988 | Japan | 55/523 |
| WO90/01471 | 2/1990 | PCT Int'l Appl. | |

Primary Examiner—Robert Spitzer

[57] ABSTRACT

A regenerable exhaust gas filter element for diesel engines includes an interlaced network of mullite crystals grown together forming a rigid porous body. Soot carried by exhaust gas from a diesel engine flowing through the filter is trapped in the porous body and thereafter burned off to regenerate the element. A network of mullite crystals in accordance with the invention is automatically interlaced and fused with one another to form the porous body of the filter element.

16 Claims, 2 Drawing Sheets

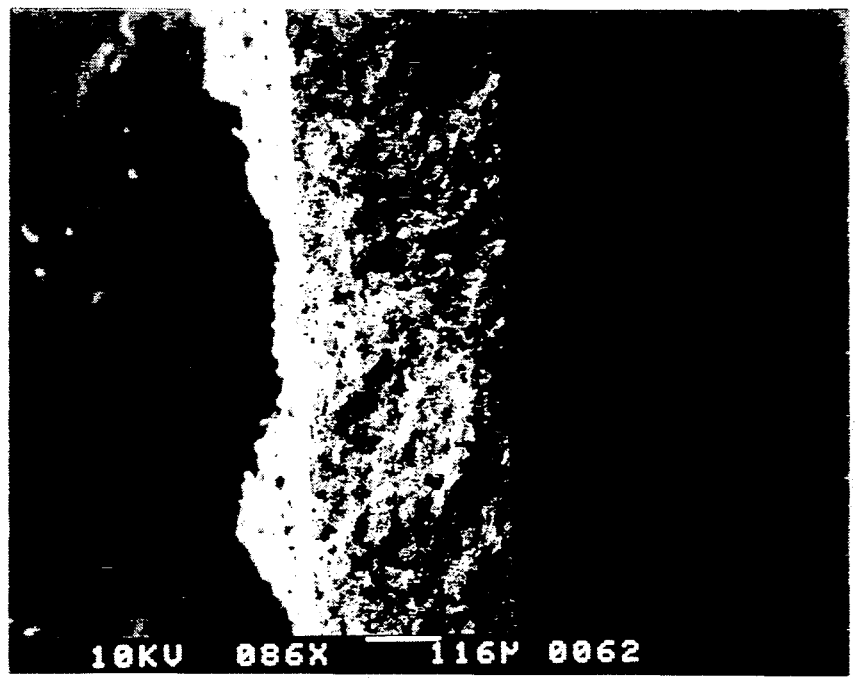
FIG 4  PRIOR ART
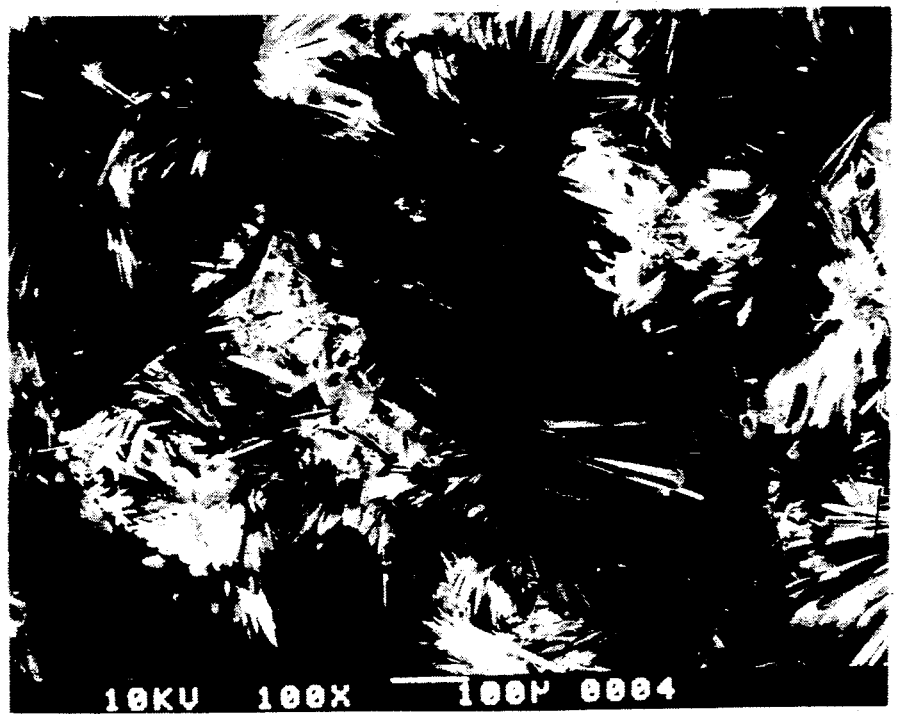

REGENERABLE EXHAUST GAS FILTER ELEMENT FOR DIESEL ENGINES

TECHNICAL FIELD

This invention relates to filters, and more particularly relates to diesel filter elements.

BACKGROUND OF THE INVENTION

Regenerable filter elements are used to collect and burn soot particles, in particular, carbon particles from diesel engine exhaust. In order to meet pollution standards for diesel engines, the filter elements are an important component of the exhaust filters. These elements are capable of being regenerated in that the soot particles contained within the elements can be burned off in situ, allowing the return of the element to its original soot-free state. This burning is generally initiated by means of a glow plug which is a component in the exhaust filter to ignite the soot captured within the filter element. Once ignited, the soot continues to burn on its own, and in so doing causes the filter element to reach very high temperatures. Eventually, the soot burns itself off and the filter element cools down to a normal operating temperature. The filter element continues to collect soot and so eventually will need to be regenerated again in the above described manner. Therefore, the burning off of the soot is done on a periodic basis, either after a predetermined number of hours of operation, or when the pressure drop through the filter due to soot build-up reaches a predetermined level.

Conventional diesel exhaust filter elements are made of porous structures of cordierite or other materials that are capable of trapping the small soot particles from diesel exhausts while allowing the exhaust gases themselves to flow through the elements. In order to form the filter element, these materials are fashioned into various structures such as a reticulated ceramic foam, or a mat of bonded fibers. These materials are then formed into configurations that greatly increase the surface area of the element. Traditionally, this was done by configuring shapes out of the elements that direct the exhaust gases down long narrow channels that are plugged at their downstream ends, forcing the exhausts to seep through the walls of the channels where the soot is trapped. Once on the other side of the channel walls, the exhaust gases are now in channels which are plugged at their upstream ends and the gases are forced out the downstream end of the filter element. One of the usual methods for forming the channels was by fabricating corrugated sheets bound on both sides by flat sheets. These resultant channels were alternately plugged, appropriately, at one end or the other and the bound sheets were rolled into a spiral configuration to form a cylindrical filter element. In addition, structures such as a bundle of hollow tubes with a honeycomb or some other polygonal cross-section were also utilized.

These previous elements were limited in that they lacked: 1.) the strength needed to endure the ride of a moving vehicle, 2.) the ability to stand-up to the high temperatures achieved during the burning off of the soot, and 3.) the endurance to withstand the numerous thermal cycles resulting from the repeated regeneration process that is to be encountered throughout the lifetime of the vehicle. It is not desirable to have to replace the elements due to the added expense and the inconvenience. Cordierite in particular is not very attractive for these reasons, as it is not nearly as strong as mullite and it also has a lower service temperature (1000° C.) than does mullite (1700° C.). Cordierite also has a lower heat capacity per unit volume than does mullite. A lower heat capacity is undesirable because it results in the filter element reaching a higher temperature during regeneration and this adds to degradation of the element due to the thermal shock experienced by the element.

Considerable pressure drop was experienced across the above described prior art elements, that is to say, a reduction in pressure from the input of the element to the output of the element. This is a consequence of the exhaust gas passing through a tortuous path of narrow pores in the elements. This pressure drop must be kept to a minimum as it results in back pressure being experienced by the engine which degrades the performance of the engine. Pressure drops in these types of filter elements are affected by such factors as the surface area of the element, the permeability of the element, and the amount of soot presently collected within the element. Generally, the greater the surface area of an element, the less the pressure drop across the input and output of the element under a given set of operating conditions. The same generally holds true for greater permeability. Furthermore, an increase in soot build-up increases the pressure drop, so it would be especially advantageous to have a filter element with a lower pressure drop.

Prior art attempts to solve these problems have included: (1) forming cordierite into a spiral corrugated form; (2) a mat of bonded fibers formed from various ceramic materials; and (3) a bundle of hollow tubes with a honeycomb cross-section also formed from various ceramic materials. Specific examples of these attempts are as follows.

U.S. Pat. No. 4,560,478 issued to Narumiya on Dec. 24, 1985 and assigned to Bridgestone Tire Co. of Tokyo discloses a porous ceramic article comprising a porous ceramic body having a three-dimensional network of strands defining interconnected cells. The cells are characterized in that at least one compound selected from the group consisting of nitrides, carbides, borides and silicides of metals is dispersed in or deposited on the strands of the porous ceramic body. It is stated in the patent that the porous ceramic articles or structures may be used as traps for particulates in exhaust gases such as diesel engine exhaust gases, or for other filter applications. It was furthermore stated that the porous ceramic bodies are preferably formed of needle-like crystals of mullite formed from alumina or cordierite to achieve high temperature strength, and that the body is preferably formed of these materials by applying a ceramic slurry to an open-cell foam of synthetic resin to form a reticulated ceramic foam structure.

U.S. Pat. No. 4,264,760 issued to Higuchi et al. on Dec. 21, 1982 and assigned to NGK Insulators, Ltd. of Nagoya, Japan discloses a ceramic honeycomb filter comprising a ceramic honeycomb structural body having a multiplicity of parallel channels extending therethrough. The selected channels are sealed at one end of the body while the remainder of the channels are sealed at the opposite end of the body in such a manner that, as dust-containing gas flows therethrough from one end of the body to the opposite end of the body, the gas flows through the walls between adjacent ceramic channels where the dust particles are collected. The production of ceramic honeycomb structural bodies was furthermore described as an extrusion process starting with fine powders of raw material such as alumina, silica, mullite, silicon carbide, silicon nitride, cordierite or the like blended with an organic binder and a plasticizer. The mixture is extruded through a die having a large number of slits capable of forming channels of a given shape in the monolith structure to be extruded. The extruded structure is dried and fired to obtain a porous ceramic honeycomb structural body.

U.S. Pat. No. 4,652,286 issued to Kusuda et al. on Mar. 24, 1987 and assigned to Matshushita Electric Industrial Co., Ltd. of Kadoma, Japan discloses an exhaust gas filter for diesel particulates, comprising a row of a plurality of channels of a honeycomb structure of porous sintered ceramic fiber composite sheets. The ceramic fiber composite sheet is produced by a paper-forming method from a slurry of alumina-silicate fibers and fire clay. The honeycomb structure of the ceramic fiber composite sheet is formed by stacking planar sheets and corrugated sheets one atop the other. The production of the sintered ceramic fiber composite sheet was furthermore described as starting with ceramic fiber of alumina-silica or silica which is cut by a chopper into short fibers or predetermined lengths. Further steps are taken to form a slurry which is eventually sintered to yield the ceramic fiber composite sheet.

U.S. Pat. No. 4,761,323 issued to Muhlratzer et al. on Aug. 2, 1988 and assigned to Man Technologie GmbH of Munich discloses a method for the production of soot filters using felt-like or other bats as filter elements which are made up of loose refractory fibers. To bond the fibers together and to anchor them in place, the filter element is coated by chemical vapor deposition or precipitation from a solution to give an amorphous, refractory coating which bonds the fibers together at their crossovers. The starting material was furthermore described as a felt-or wadding-like fiber bat made up of loose fibers which are mixed and entangled with each other.

PCT/US 89/03175 to Talmy, Inna G. and Haught, Deborah A. filed on 26 July 1989 discloses a process in which $AlF_3$ and $SiO_2$ or $AlF_3$, $SiO_2$, and $Al_2O_3$ powders are formed into a green body of a desired shape and size and then heated at 700° C. to 950° C. in an anhydrous $SiF_4$ atmosphere to form bar-like topaz crystals, then heated in an anhydrous $SiF_4$ atmosphere at about 1150° C. to 1700° C. to convert the bar-like topaz to needle-like single crystal mullite whiskers which form a porous, rigid felt structure. The felt structure was described as comprising single crystal mullite whiskers which were uniformly distributed and randomly oriented in three dimensions and which were mechanically interlocked to form a rigid felt structure capable of maintaining its shape without binders. The whiskers were composed of stoichiometric mullite or solid solutions of $Al_2O_3$ in stoichiometric mullite. A suggested application for the felt was as preforms for ceramic-matrix or metal-metal matrix composites or by itself as thermal insulation.

Therefore, it is an object of the present invention to provide a regenerable filter element which is more permeable, stronger, more tolerant of high temperatures and more tolerant of thermal cycling than prior art elements. This element may include an interlaced network of mullite crystals that are grown and fused together to form a rigid porous body for the purpose of collecting and burning off soot from diesel engine exhaust.

It is yet still a further object of the present invention to provide a regenerable filter element which includes an interlaced network of mullite crystals that are formed and fused together by pyrolysis of fluorotopaz to form a rigid porous body for the purpose of collecting and burning off soot from diesel engine exhaust.

It is yet still a further object of the present invention to provide a regenerable filter element which includes an interlaced network of non-stoichiometric mullite crystals of about 2:1 molar ratio of alumina to silica that are formed and fused together to form a rigid porous body for the purpose of collecting and burning off soot from diesel engine exhaust.

SUMMARY OF THE INVENTION

In accordance with the objects of this invention, there is provided a regenerable exhaust gas filter element for diesel engines comprising an interlaced network of mullite crystals grown together and automatically interlaced and fused with one another to form a rigid porous body such that the soot carried by exhaust gas from a diesel engine flowing therethrough is trapped in the porous body and may thereafter be burned off to regenerate the element. The element of the present invention is significantly stronger and is more tolerant of thermal cycling than single crystals that are larger than prior art elements which permits the element to operate with a lower pressure drop across the input and output of the element than prior art elements.

The present filter element may include an interlaced network of single crystal mullite whiskers formed by the pyrolysis of fluorotopaz, which automatically forms the network of single crystals. The present element preferably includes an interlaced network of single crystal mullite whiskers made from non-stoichiometric mullite crystals having about a 2:1 molar ratio of alumina to silica, rather than a stoichiometric ratio as described in the prior art.

BRIEF DESCRIPTION OF THE DRAWINGS

The nature and extent of the present invention will be clear from the following detailed description of the particular embodiments thereof, taken in conjunction with the appendant drawings, in which:

FIG. 4 is an SEM photograph of a prior art cordierite diesel exhaust gas filter taken along a fractured surface of one of the element structures; and FIG. 5 is an SEM photograph of a similar mullite filter element material prepared in accordance with the present invention.

DETAILED DESCRIPTION OF THE INVENTION

Figure 1:
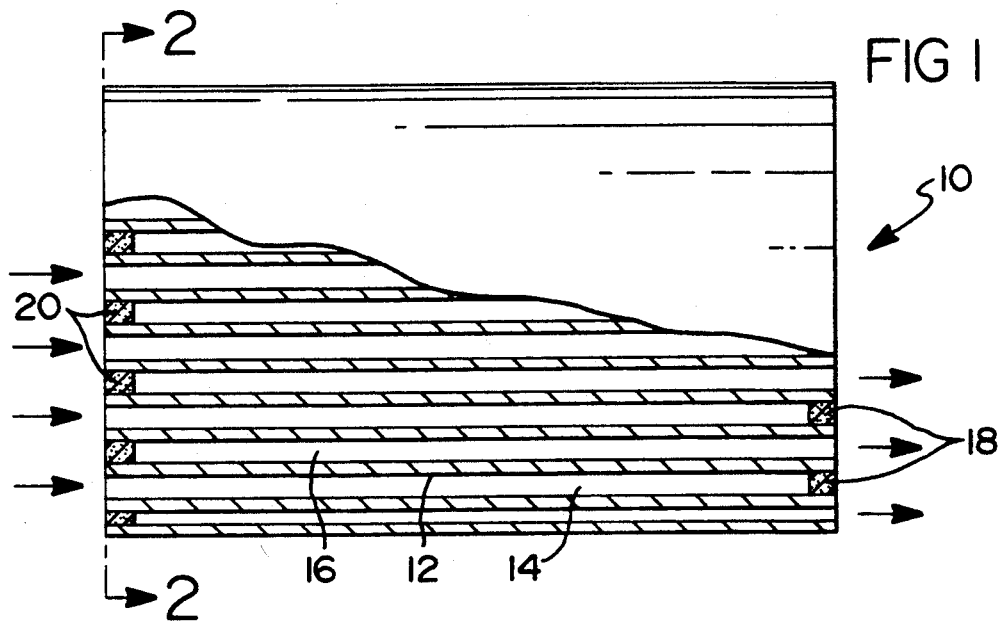
FIG. 1 shows a partial cut-away view of a side of the diesel filter element constructed in accordance with the present invention, wherein the channels and channel end plugs are visible as well as a cross-section of the walls separating the channels.

Referring first to FIG. 1, a diesel exhaust filter is generally denoted by the numeral 10. Channel walls 12 separate intake channels 14 from exhaust channels 16.

The intake channels are formed by plugging their downstream ends with plugs 18 while the exhaust channels are formed by plugging their upstream ends with plugs 20. Its operation is discussed in more detail hereinbelow with reference to FIG. 3.

Figure 2:
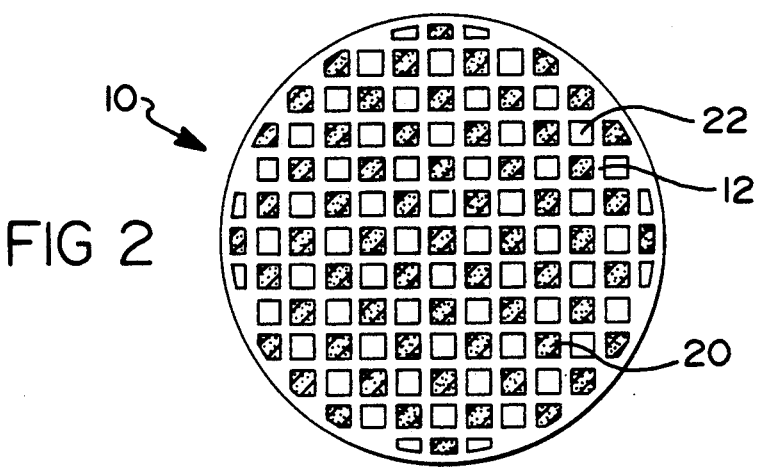
FIG. 2 shows an end view of the diesel filter element of FIG. 1 revealing the ends of the channels which are alternately plugged and unplugged.

Referring next to FIG. 2, a view depicting the upstream end of the diesel filter is seen from its side. Upstream ends 22 of the intake channels are seen surrounded by the channel walls 12. Also surrounded by the channel walls are plugs 20 for the upstream ends of the exhaust channels As can be seen from FIG. 2, adjacent intake and exhaust channels alternate positions along rows as well as along columns.

Figure 3:
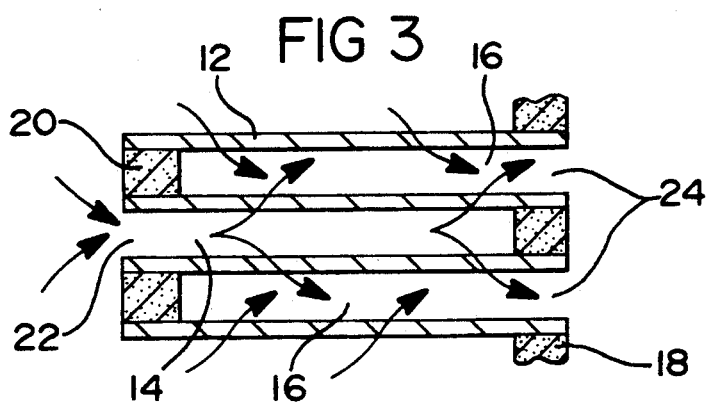
FIG. 3 depicts the channels more clearly and the direction of the flow of the diesel exhaust gases therethrough.

Referring next to FIG. 3, depicting the detail of the channels, we see where the gases enter into the upstream end 22 of intake channel 14, flow through walls 12, and exit through the downstream ends 24 of exhaust channels 16. In this embodiment of the present invention, the plugs that seal up the ends of the channels determine which channels serve as intake channels and which channels serve as exhaust channels. An intake channel is formed by leaving the channel end open at the upstream end of the filter while sealing the end of the same channel at the downstream end of the filter. This way, the gases enter the upstream end of the channel and are forced to flow through the surrounding walls of the channel. Likewise, an exhaust channel is formed by plugging up the channel end at the upstream end of the filter while leaving the end of the same channel open at the downstream end of the filter. This way, the gases flowing through the surrounding walls into the exhaust channel will be allowed to flow freely out the downstream end of the channel while being blocked from flowing out the upstream end.

The walls 12 of the filter element must be capable of trapping and retaining the soot particles which are commonly found suspended in diesel exhaust gases, while at the same time allowing the gases themselves to flow through the walls without excessive resistance. As can be seen from the above description of the present invention, the honeycomb diesel exhaust filter element directs the flow of diesel exhaust gas into the upstream end of the filter element by means of designated intake channels. It then directs the gases to flow through the walls within the filter and to then exit the gases out the downstream end of the filter by means of the remaining designated exhaust channels. This way, when the diesel exhaust gases are forced to flow through the walls of the filter element as described above, the walls trap the soot particles within, hence giving rise to the filtering ability of the present invention. After a sufficient amount of soot has collected within the walls of the filter element, the soot can be ignited by means of a glow plug. Once ignited, the soot will continue to burn on its own until it has burned off. This process is called regeneration and the techniques of applying a glow plug to initiate this process are well known in the art. During regeneration, the filter element can reach very high temperatures as the soot is burning. The filter element eventually cools down after the soot is burned off, but the regeneration process must occur repeatedly since more soot will be collected as long as diesel exhaust gases flow through the filter element. The material used for the filter element of the present invention is well suited to meet these demanding thermal conditions.

Any filter element such as the one just described naturally offers a certain amount of resistance to the flow of exhaust gases. This resistance is due, to a small degree, to the restrictive nature of the narrow channels along which the exhaust gases must travel, but is largely due to the finite permeability of the channel walls through which the gases are forced to flow. The result of this resistance to the flow of exhaust gases through the filter element is that a pressure drop develops from the upstream end of the filter to the downstream end of the filter. In a diesel exhaust filter application, this pressure drop is undesirable since it causes the engine to experience increased back pressure which reduces the engine's efficiency. There is, however, inherent in the design of the diesel exhaust filter element of the present invention, two characteristics which serve to reduce the undesired pressure drop across the filter element. Firstly, because of a large surface area created by the channel walls, the pressure drop of the gases through the filter is reduced. As a further consequence of this large surface area, the diesel soot is more evenly distributed throughout the available filter material contained in the filter element. The second characteristic is a greatly increased permeability of the filter element which results from its especially porous nature as described in greater detail hereinbelow.

Pursuant to a preferred embodiment of the present invention, the walls of the filter element are made of an interlaced network of fused whiskers made of single crystal mullite, preferably of a non-stoichiometric material. The mullite whisker network shown in the SEM photograph of FIG. 5 was grown and fused together by a process similar to those of the examples which will be given hereinbelow. As can be seen from the photograph, the individual mullite whiskers are interlaced and randomly oriented in a somewhat cross-cross fashion and are attached to one another at relatively few points along their lengths. There are relatively large distances from whisker to whisker with large open spaces between the whiskers. This is in contrast to, say, a more orderly, and compact arrangement where the whiskers are laying more or less side by side. If the whiskers were not fused together, but were instead formed into a loose mat, they would be free to slide or jiggle around and would tend to settle into a more compact form, thereby reducing the open spaces between the whiskers.

FIG. 4 shows an SEM photograph of the fractured surface of a side portion of an individual cell wall of a cordierite diesel exhaust filter element of the prior art at 086X magnification. For comparison, FIG. 5 shows the interlaced network mullite material of the present invention at 100X magnification. While the magnifications are not identical, they are close and we believe a comparison between the two shows the dramatic difference in porosity and the consequent permeability. As can be seen from the Figures, the cordierite is much more dense than the mullite network of the present invention.

In the randomly interlaced and fused network of the present invention, there is a considerable amount of open spaces between the whiskers, giving the network substantial porosity. These open spaces, which are large and account for a large percentage of the total volume of the material, can be readily seen in FIG. 5. The improvement over prior art filter elements becomes even more evident when this material is compared to the material shown in FIG. 4, which is an SEM photograph of a fractured surface of a sample of a filter element made from cordierite. From this photograph it can be seen that the cordierite has very small holes which do not account for nearly as large a percentage of the material per unit volume as does the open spaces in the mullite whisker lattice. This gives the cordierite material a substantially lower permeability, and consequently increases the back pressure which impedes the performance of the exhaust system.

Particularly useful for the filter element of the instant invention is a non-stoichiometric mullite structure having single crystal whiskers with individual whisker lengths predominantly of from about 0.05 micrometers to about 2 micrometers, individual whisker diameters of from about 4 to about 30 micrometers, and aspect ratios of from about 10 to about 50. The preferred composition of the non-stoichiometric mullite itself is $2Al_2O_3 \cdot SiO_2$ having a 2:1 ratio of alumina to silica instead of the stoichiometric 3:2 mullite, $3Al_2O_3 \cdot 2SiO_2$. This composition of mullite is preferably formed by the pyrolysis of fluorotopaz in the presence of catalysts and fluxes as described more fully hereinbelow.

The whiskers of the present invention are grown and fused simultaneously and this has an advantage over a network of whiskers which are first grown in one step, and then bonded together in a later step. A network of whiskers that is bonded together from loose whiskers sometime after the whiskers are individually grown is in danger of having the loose whiskers settle into a less porous structure before they have a chance to be bonded together. When the mullite whiskers of the present invention are grown, they grow randomly in all directions with large distances between the whiskers and with large open spaces between the whiskers. But as the whiskers grow, they fuse with one another where they touch, and this preserves the open nature of the whisker lattice by never allowing the whiskers the chance to settle and lose the porosity of the lattice.

The large porosity of the filter element of the present invention results in pathways by which a gas can permeate the entire filter element, giving rise to a substantial permeability which is needed in a useful diesel filter application. At the same time, the tortuosity of the flow of the gases around the multitude of whiskers which the gas encounters serves to entrap the soot carried by the gases. The soot particles in diesel exhaust gases, because of their range of sizes, are subject predominantly to projectile motion. They cannot turn the sharp corners around the whiskers as rapidly as the gases can, and instead are more likely to follow a much straighter path and collide with a whisker. The soot particles are oily and remain stuck to the whisker. The large whiskers of the present invention are especially beneficial because they make the filter element more permeable while still retaining the ability to trap soot.

Mullite is an excellent material for diesel filter applications for many reasons, including its high thermal shock resistance, high thermal conductivity, large heat capacity and high mechanical strength. Its high thermal shock resistance is valuable in the present invention because of the high temperatures experienced during regeneration of the filter. These temperatures can reach 1700° C., and over the lifetime of the filter, the cycling from ambient temperature to this high temperature during regeneration can occur hundreds of thousands of times. Therefore, not only does the filter material need to reach this high temperature without deteriorating, it must also withstand repeated cycles between high and low temperature extremes. Mullite stands up to these demands very well.

The high thermal conductivity of mullite is also valuable because of the operating conditions mentioned above. A high thermal conductivity allows the filter element to conduct to its surroundings the large amount of heat that is produced during regeneration before the element has a chance to get too hot. These is especially helpful for preventing hot spots, or areas of locally high temperatures, within the element since these will cause non-uniform thermal expansion and lead to further mechanical stress. Particularly useful then, is the non-stoichiometric 2:1 mullite ($2Al_2O_3 \cdot SiO_2$) of the preferred embodiment because it has a measured thermal conductivity of 12.4 W/mK vs. 4.0 W/mK for the normal stoichiometric 3:2 mullite ($3Al_2O_3 \cdot 2SiO_2$). The 2:1 mullite also has a more nearly isotropic thermal expansion than does 3:2 mullite which helps the diesel filter withstand thermal shock.

Another advantage to mullite with respect to the temperature demand is its large heat capacity. For a specific amount of heat energy absorbed by the filter material from the regeneration process, a larger heat capacity enables a lower temperature being attained by the filter material because the material has a larger capacity for heat per degree of increased temperature. Operating at a lower temperature tends to decrease the thermal shock experienced by the filter material. Mullite, having a larger heat capacity than cordierite and other candidate materials, benefits from this property when used in a diesel filter application such as the present invention. The high mechanical strength of mullite is also advantageous in diesel filter applications because it is better able to withstand the vibrations encountered when attached to a moving vehicle.

In the present invention, the fusion of the mullite whiskers to one another gives the filter element considerable strength beyond that which would be attained with just a loose mat of whiskers. In a loose mat, the whiskers are free to slide around, and since the whiskers are not self supporting, an element made of loose whiskers requires a special container to hold them. In the present invention, the fusion of the whiskers at the places where they touch one another during their growth results in bonds between the whiskers that are much stronger than the bonds occurring in networks of whiskers which are joined by other means. This makes the entire filter element much stronger and better able to stand-up to the vibrations of a moving vehicle, which is an advantage for a diesel engine filter.

A typical method for bonding together whiskers in the prior art is to coat loose whiskers with a material which adheres to the individual whiskers and also makes them able to adhere to one another where they touch. An example of such prior art is U.S. Pat. No. 4,761,323 issued to Muhlratzer et al. on Aug. 2, 1988 and assigned to Man Technologie GmbH, Munich. In their invention, the whiskers are coated and simultaneously fused using a CVD process.

In the preferred embodiment of the present invention, an interlaced network of fused whiskers is made of single crystal non-stoichiometric mullite and is fabricated as follows. The starting materials consist of a source of aluminum and a source of silicon. For example, the preferred aluminum source can be a compound such as alumina, and the preferred silicon source can be a compound such as silica. There should also be a source of fluorine such as $SiF_4$, $AlF_3$, HF, $Na_2SiF_6$, NaF or $NH_4F$. Prior art examples of the use of some of these fluorine sources can be found in the following publications: Derwent Publication 84-264450/43 which gives examples of AlF$_3$ and HF fluorine sources; Chemical Abstracts Vol. 70, 1969, 9035q, Hanus Landspersky, discusses probable mechanisms of mullite formation with several fluorides; Inorganic Chemistry Vol. 99, 1983, 99:132640n Abdel Rehim, NH$_4$F as a fluorine source; Chemical Abstracts Vol. 70, 1969, 31332j talks about using NaF; Chemical Abstracts Vol. 94, 1981, 94:144160r Choi, Sang-Wook et al. Na$_2$SiF$_6$; and Derwent Publication 90307R-L disclosing SbF$_3$, NH$_4$F, HF, Na$_2$SiF$_6$, LiF, AlF$_3$, and 3½ H$_2$O and BaF$_2$ fluorine sources.

For this embodiment, regardless of the starting materials used, they should have a molar ratio of aluminum to silicon of about 4:1. The starting materials are mixed together by various methods such as dry or wet blending, ball milling, etc., or any other well known method of mixing. The materials are then placed in a furnace and heated to about 750° C. for about 2 hours to form fluorotopaz. The fluorotopaz is then pyrolyzed by heating it to about 1100° C. for about 2 hours to form an interlaced network of fused whiskers of single crystal non-stoichiometric mullite. In the preferred embodiment, the crystals of mullite have about a 2:1 molar ratio of alumina to silica. The following are specific examples of methods for the formation of a network of a single crystal non-stoichiometric mullite whiskers in accordance with the present invention.

EXAMPLES

Example 1

A mixture containing 3.4 parts by weight of alpha alumina and 1 part by weight of fused (amorphous) silica was dry-blended by tumbling. The mixture was placed in a furnace that was connected to a flexible plastic bag containing gaseous SiF$_4$. The furnace and its contents were evacuated, then back-filled with the SiF$_4$ from the bag, and then heated to 1125° C. As the temperature approached 950° C., the bag could be seen to shrink as SiF$_4$ was absorbed by the contents of the furnace which were being converted to fluorotopaz. At about 1050° C. the bag began to expand bag to its original volume as fluorotopaz began to decompose and release SiF$_4$. Heating continued until the furnace reached 1125° C. This temperature was maintained for approximately one hour, and then the furnace was cooled to room temperature. After cooling, the bag containing SiF$_4$ was disconnected from the furnace and an inert gas was purged through the furnace until substantially all traces of SiF$_4$ were removed. The furnace now contained fused and interlaced whiskers of single crystal non-stoichiometric mullite of the composition 2Al$_2$O$_3$·SiO$_2$.

Example 2

Thin disks were prepared by dry-pressing fluorotopaz powders at 500 psi. The powders contain various amounts of a flux and a binder. The flux was a mixture containing 33.1 mole % MgF$_2$ and 66.9 mole % LiF. The diameter of the pellets was 1.125 inches. The pellets were fired at 600° C. for 3 hours to burn out the binder. They were then heated in an atmosphere of SiF$_4$ to 700° C. at a rate of 10° C./minute. The disks were then heated to 950° C. at a rate of 3° C./minute, then to 1050° C. at the rate of 1° C./minute, and finally to 1120° C. at 0.5° C./minute. They were held at 1120° C. for 4 hours. The resultant disks were tested and it was found that they were now made of fused and interlaced whiskers of single crystal non-stoichiometric mullite of the composition 2Al$_2$O$_3$·SiO$_2$.

The materials made in the above examples exhibit a high porosity and excellent permeability. The resultant mullite network can easily be formed into a diesel filter element in any desired shape or configuration.

Thus, there is provided in accordance with the present invention, a method for making a diesel exhaust filter element made with a randomly interlaced network of single crystal mullite whiskers grown and fused together to form a rigid porous body. The mullite whiskers are preferably large and of the non-stoichiometric composition 2Al$_2$O$_3$·SiO$_2$. The filter composed of this network of whiskers is extremely porous and permeable to gases which reduces the pressure drop in a flow of gas through the filter. The filter is also extremely tolerant of mechanical vibrations, thermal shock and thermal cycling, making it exceptional for use as a diesel exhaust filter element. The preferred embodiment of the filter element is formed into a honeycomb configuration with inlet channels and exhaust channels which force the gases to flow through the porous walls between the channels where soot from the gases collect. The soot is periodically ignited by means of a glow plug and allowed to burn itself off.

While our invention has been described in terms of a specific embodiment, it will be appreciated that other embodiments could readily be adapted by one skilled in the art. Accordingly, the scope of our invention is to be limited only by the following claims.

We claim:

1. A regenerable exhaust gas filter element for diesel engines, comprising:
   an interlaced network of mullite crystals grown together to form a rigid porous body such that the soot carried by exhaust gas from a diesel engine flowing therethrough is trapped in the porous body, said network of mullite crystals being automatically interlaced and fused with one another to form the porous body.

2. The element of claim 1, wherein said interlaced network of mullite crystals includes randomly oriented mullite crystals.

3. The element of claim 1, wherein said crystals are substantially single crystals.

4. The element of claim 1, wherein said crystals are grown and fused together by pyrolysis of fluorotopaz.

5. The element of claim wherein said mullite crystals have diameters of between about 4 and about 30 micrometers.

6. A regenerable exhaust gas filter element for diesel engines, comprising:
   an interlaced network of mullite crystals grown together to form a rigid porous body such that the soot carried by exhaust gas from a diesel engine flowing therethrough is trapped in the porous body, said network of mullite crystals being formed from alumina and silica by pyrolysis of fluorotopaz to automatically interlace and fuse with one another to form the porous body.

7. The element of claim 6, wherein said interlaced network of mullite crystals includes randomly oriented mullite crystals.

8. The element of claim 6, wherein said crystals are substantially single crystals.

9. The element of claim 6, wherein said mullite crystals have diameters of between about 4 and about 30 micrometers.

10. A regenerable exhaust gas filter element for diesel engines, comprising:

an interlaced network of mullite crystals grown together to form a rigid porous body such that the soot carried by exhaust gas from a diesel engine flowing therethrough is trapped in the porous body, said network of mullite crystals including non-stoichiometric crystals of alumina and silica, and said network of mullite crystals being automatically interlaced and fused with one another to form the porous body.

11. The element of claim 10, wherein said interlaced network of mullite crystals includes randomly oriented mullite crystals.

12. The element of claim 10, wherein said crystals are substantially single crystals.

13. The element of claim 10, wherein said crystals are grown and fused together by pyrolysis of fluorotopaz.

14. The element of claim 10, wherein said mullite crystals have diameters of between about 4 and about 30 micrometers.

15. The element of claim 10, wherein said non-stoichiometric crystals are crystals of about 2:1 molar ratio of alumina to silica.

16. A regenerable exhaust gas filter element for diesel engines, comprising:

a randomly oriented interlaced network of substantially single crystal mullite whiskers grown together to form a rigid porous body, said mullite whiskers individually having diameters of between about 4 and about 30 micrometers, and aspect ratios of between about 10 and about 50, said mullite whisker network being fabricated from alumina and silica by pyrolyzing fluorotopaz to form mullite crystals.

* * * * *

UNITED STATES PATENT AND TRADEMARK OFFICE
CERTIFICATE OF CORRECTION

PATENT NO. : 5,098,455
DATED : March 24, 1992
INVENTOR(S) : Peter A. Doty, et al.

It is certified that error appears in the above-identified patent and that said Letters Patent is hereby corrected as shown below:

Column 10, line 50, "5. The element of claim wherein said mullite crystals", should correctly read --5. The element of claim 1 wherein said mullite crystals--.

Signed and Sealed this

Twentieth Day of July, 1993

Attest:

MICHAEL K. KIRK

Attesting Officer     Acting Commissioner of Patents and Trademarks